United States Patent
Hase et al.

(10) Patent No.: US 11,314,257 B2
(45) Date of Patent: Apr. 26, 2022

(54) AUTONOMOUS VEHICLE COLLISION AVOIDANCE SYSTEM WITH UNATTACHED LOAD DETECTION

(71) Applicant: DENSO CORPORATION, Kariya (JP)

(72) Inventors: Tomomi Hase, Kariya (JP); Noriaki Ikemoto, Kariya (JP); Mitsuharu Higashitani, Kariya (JP)

(73) Assignee: DENSO CORPORATION, Kariya (JP)

( * ) Notice: Subject to any disclaimer, the term of this patent is extended or adjusted under 35 U.S.C. 154(b) by 220 days.

(21) Appl. No.: 16/288,955

(22) Filed: Feb. 28, 2019

(65) Prior Publication Data

US 2019/0278279 A1    Sep. 12, 2019

(30) Foreign Application Priority Data

Mar. 8, 2018   (JP) .............................. JP2018-042002

(51) Int. Cl.
*G05D 1/02*   (2020.01)
*B60W 30/09*   (2012.01)

(52) U.S. Cl.
CPC ........... *G05D 1/0214* (2013.01); *B60W 30/09* (2013.01); *G05D 1/0289* (2013.01); *B60W 2554/804* (2020.02); *G05D 2201/0213* (2013.01)

(58) Field of Classification Search
CPC ......... G05D 2201/0213; G05D 1/0289; G05D 1/0214; B60W 2554/804; B60W 30/0956
See application file for complete search history.

(56) References Cited

U.S. PATENT DOCUMENTS

| | | | |
|---|---|---|---|
| 6,138,062 A | 10/2000 | Usami | |
| 9,452,754 B2* | 9/2016 | Clarke | B60W 50/14 |
| 2016/0068156 A1* | 3/2016 | Horii | B60W 30/0956 |
| | | | 701/28 |
| 2018/0208196 A1* | 7/2018 | Kurata | G08G 1/165 |
| 2019/0071072 A1* | 3/2019 | Seo | B60W 30/09 |
| 2019/0121362 A1* | 4/2019 | Russell | G05D 1/0214 |
| 2019/0206260 A1* | 7/2019 | Pilkington | B60Q 1/44 |

FOREIGN PATENT DOCUMENTS

| | | |
|---|---|---|
| JP | 2005-115484 A | 4/2005 |
| JP | 2007-264818 A | 10/2007 |
| JP | 2011-204125 A | 10/2011 |

* cited by examiner

*Primary Examiner* — Peter D Nolan
*Assistant Examiner* — Kenneth M Dunne
(74) *Attorney, Agent, or Firm* — Oliff PLC

(57) ABSTRACT

A control apparatus for an automatic-driving vehicle includes a load state detecting unit and a collision preventing unit. The load state detecting unit detects a load state of the other vehicle that is present in a periphery of the automatic-driving vehicle. The collision preventing unit performs a collision prevention process based on the load state detected by the load state detecting unit. The collision prevention process is a process for preventing, in advance, collision of an automatic-driving vehicle with a load that may fall onto a road from the other vehicle.

16 Claims, 12 Drawing Sheets

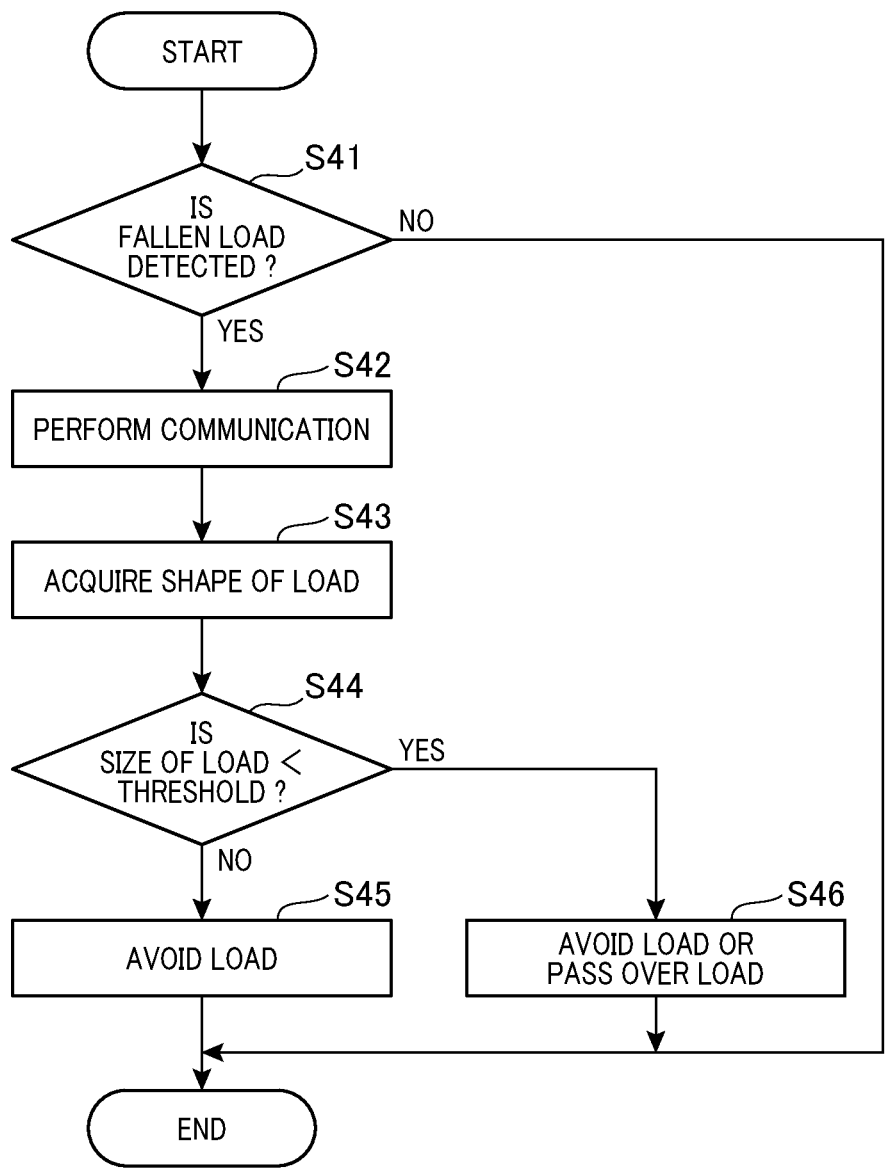

AUTONOMOUS VEHICLE COLLISION AVOIDANCE SYSTEM WITH UNATTACHED LOAD DETECTION

CROSS-REFERENCE TO RELATED APPLICATION

This application is based on and claims the benefit of priority from Japanese Patent Application No. 2018-042002, filed Mar. 8, 2018. The entire disclosure of the above application is incorporated herein by reference.

BACKGROUND

Technical Field

The present disclosure relates to a control apparatus for an automatic-driving vehicle.

Related Art

The development of automatic-driving vehicles is advancing. An automatic-driving vehicle is a vehicle that is capable of automatically performing all driving operations (driving, steering, and braking) necessary for travel, without being based on manual operations by a passenger.

SUMMARY

The present disclosure provides a control apparatus for an automatic-driving vehicle. The control apparatus detects a load state of the other vehicle that is present in a periphery of the automatic-driving vehicle. The control apparatus detects performs a collision prevention process based on the detected load state. The collision prevention process is a process for preventing, in advance, collision of the automatic-driving vehicle with a load that may fall onto a road from the other vehicle.

BRIEF DESCRIPTION OF THE DRAWINGS

In the accompanying drawings:

FIG. 14 is a flowchart of the flow of processes performed by a control apparatus according to a fourth embodiment.

DESCRIPTION OF THE EMBODIMENTS

Figure 1:
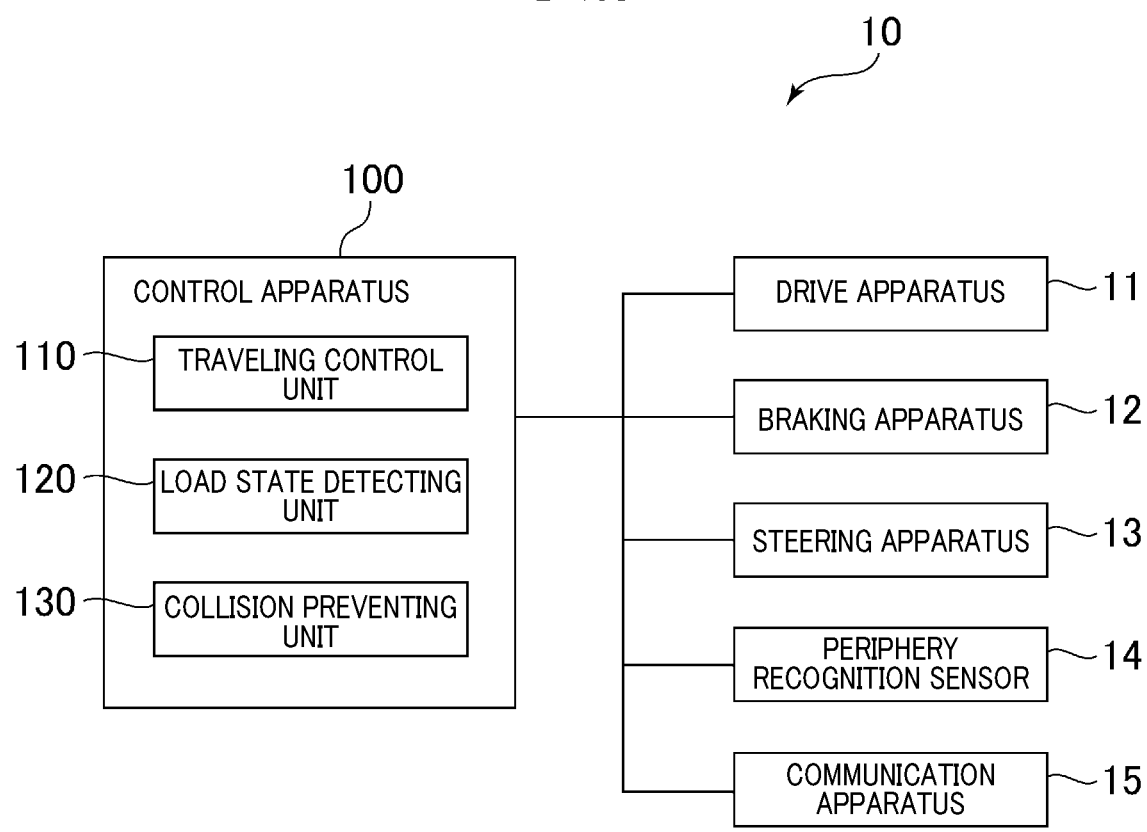
FIG. 1 is a diagram schematically showing an overall configuration of a control apparatus and an automatic-driving vehicle in which the control apparatus is mounted, according to a first embodiment.

In embodiments of the present disclosure, the following matters are considered.

Vehicles other than the automatic-driving vehicle also travel on roads traveled by the automatic-driving vehicle. These other vehicles include vehicles such as trucks that transport loads, such as cargo. When a load falls onto a road from another vehicle such as this, the automatic-driving vehicle may collide with the load.

An apparatus is known that is capable of warning can warn a driver when a load is assumed to have fallen from an own vehicle. When a load falls from a vehicle that is provided with such an apparatus, the driver of the vehicle can take action, such as immediately stopping the vehicle and removing the load from the road After a load has fallen onto the road, an automatic-driving vehicle that is traveling in the periphery thereof is required to avoid collision with the load. However, even if a process such as sudden braking is started after the fall of the load is detected, collision may be unavoidable. To avoid collision with a load that has fallen from another vehicle, measures necessary for safety are preferably taken before the load actually falls.

It is thus desired to provide a control apparatus that is capable of reducing the likelihood of an automatic-driving vehicle colliding with a load that has fallen onto a road from another vehicle.

An exemplary embodiment of the present disclosure provides a control apparatus for an automatic-driving vehicle. The control apparatus includes: a load state detecting unit that detects a load state of another vehicle that is present in a periphery of the automatic-driving vehicle; and a collision preventing unit that performs a collision prevention process based on the load state. The collision prevention process is a process for preventing, in advance, collision of the automatic-driving vehicle with a load that may fall onto a road from the other vehicle.

In such a control apparatus, the load state detecting unit detects the load state of the other vehicle that is present in the periphery. The collision preventing unit performs the collision prevention process based on the detected load state. The collision prevention process is a process for preventing, in advance, collision of the automatic-driving vehicle with a load that may fall onto the road from the other vehicle. For example, as such a collision prevention process, a process in which an inter-vehicle distance between the other vehicle and the automatic-driving vehicle is increased can be given.

As a result of the collision prevention process such as that described above being performed in advance before the load actually falls onto the road, the likelihood of the automatic-driving vehicle colliding with the fallen load can be reduced.

The exemplary embodiment provides a control apparatus that is capable of reducing the likelihood of an automatic-driving vehicle colliding with a load that may fall onto a road from another vehicle.

Next, embodiments will hereinafter be described with reference to the drawings. To facilitate understanding of the descriptions, constituent elements in the drawings that are identical to each other are given the same reference numbers when possible. Redundant descriptions are avoided.

First Embodiment

A control apparatus 100 according to a first embodiment is mounted in an automatic-driving vehicle 10. The control apparatus 100 is configured as an apparatus that performs control of the automatic-driving vehicle 10. Before the control apparatus 100 is described, a configuration of the automatic-driving vehicle 10 will be described mainly with reference to FIG. 1.

The automatic-driving vehicle 10 is configured as a vehicle that is capable of automatically performing all driving operations (driving, steering, and braking) necessary for travel, without being based on manual operations by a passenger. The automatic-driving vehicle 10 includes a drive apparatus 11, a braking apparatus 12, a steering apparatus 13, a periphery recognition sensor 14, and a communication apparatus 15.

The drive apparatus 11 generates driving force that is required for the automatic-driving vehicle 10 to travel. For example, the drive apparatus 11 is an internal combustion engine. However, the drive apparatus 11 may also be a motor generator. The control apparatus 100, described hereafter, controls operations of the drive apparatus 11.

The braking apparatus 12 decelerates or stops the automatic-driving vehicle 10 by generating braking force. The braking apparatus 12 according to the present embodiment is configured as a so-called eddy current braking apparatus (ECB). The control apparatus 100 controls operations of the braking apparatus 12.

The steering apparatus 13 performs steering of the automatic-driving vehicle 10. The steering apparatus 13 performs steering by applying steering force generated by electric power to a steering shaft. The control apparatus 100 controls operations of the steering apparatus 13.

Figure 2:
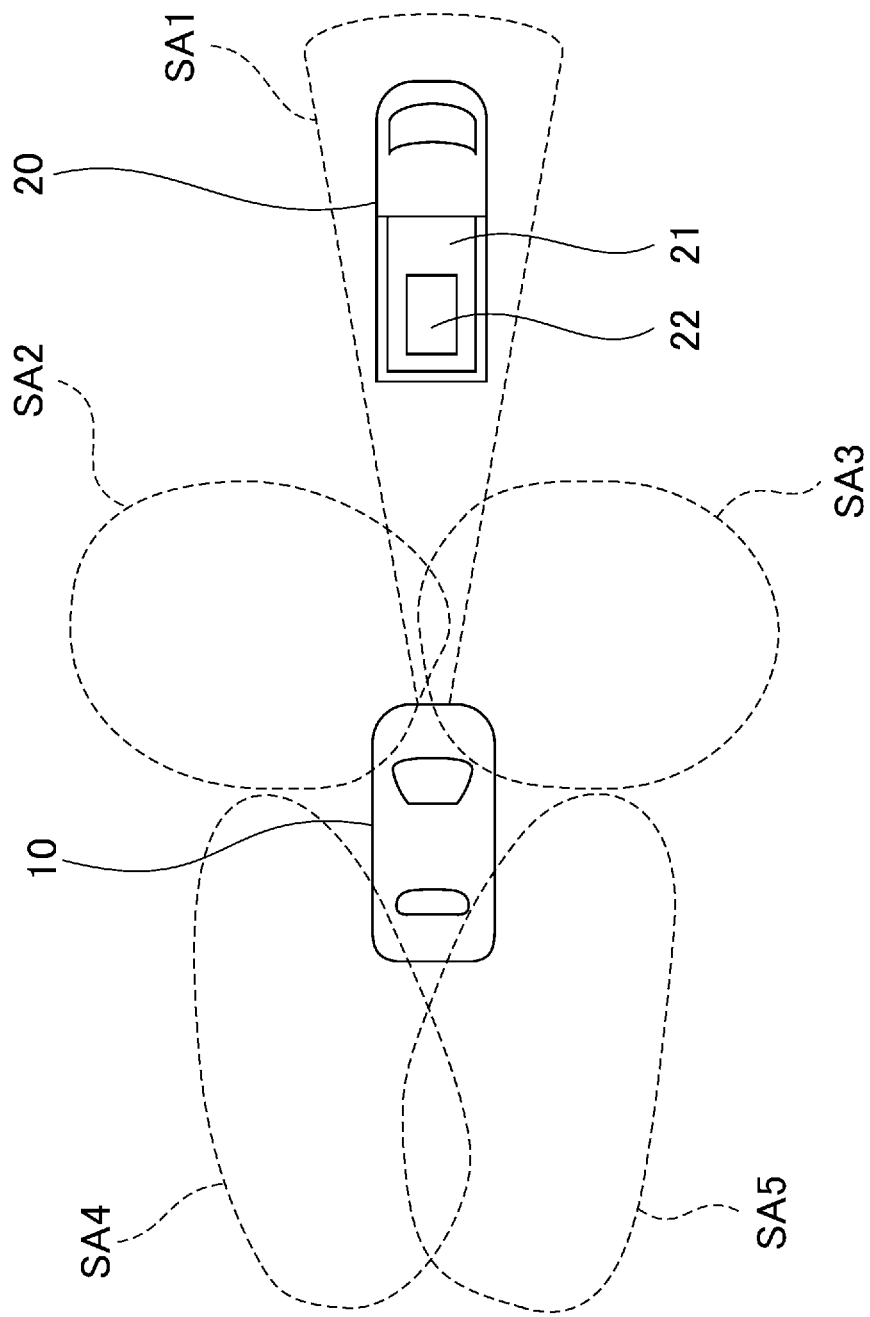
FIG. 2 is a diagram of recognition areas of a periphery recognition sensor provided in the automatic-driving vehicle.

The periphery recognition sensor 14 recognizes a state (such as positions of traffic lanes and presence of obstacles) surrounding the automatic-driving vehicle 10. According to the present embodiment, the periphery recognition sensor 14 recognizes a load state of another vehicle 20 that is present in the periphery of the automatic-driving vehicle 10. As shown in FIG. 2, the other vehicle 20 herein refers to a vehicle (such as a truck) that travels in a state in which a load 22 is loaded onto a load-carrying bed (load-carrying platform) 21. The "load state of the other vehicle 20" refers to a shape, weight (load weight), a state of fixation, and the like of the load 22 that is loaded onto the load-carrying bed 21.

The periphery recognition sensor 14 is configured by a plurality of cameras. These cameras are attached to a plurality of locations on an outer periphery of the automatic-driving vehicle 10. In FIG. 2, areas that can be captured by the cameras, that is, areas in which the load state of the other vehicle 20 can be recognized are respectively denoted by SA1, SA2, SA3, SA4, and SA5. SA1 is an area on the front side of the automatic-driving vehicle 10. SA2 is an area on the front-left side of the automatic-driving vehicle 10. SA3 is an area on the front-right side of the automatic-driving vehicle 10. SA4 is an area on the rear-left side of the automatic-driving vehicle 10. SA5 is an area on the rear-right side of the automatic-driving vehicle 10.

The periphery recognition sensor 14 is capable of separately recognizing the respective states in SA1, SA2, SA3, SA4, and SA5, such as those described above. Therefore, the load state of the other vehicle 20 can be recognized not only when the other vehicle 20 is traveling ahead of the automatic-driving vehicle 10 as shown in FIG. 2, but also when the other vehicle 20 is traveling to the side of or behind the automatic-driving vehicle 10. Information recognized by the periphery recognition sensor 14 is transmitted to the control apparatus 100.

Here, in addition to the cameras, a laser imaging detection and ranging (LIDAR) or a radar may be used as the periphery recognition sensor 14 such as that described above. Furthermore, the periphery recognition sensor 14 may perform bi-directional communication with the other vehicles 20 in the periphery, and thereby recognize the load states of the other vehicles 20. Moreover, the periphery recognition sensor 14 may be configured by a combination of a plurality of types of sensors.

The communication apparatus 15 enables the control apparatus 100 to perform wireless communication outside the automatic-driving vehicle 10. The control apparatus 100 is capable of performing bi-directional wireless communication with the other vehicles 20 in the periphery, a management center, and the like, through the communication apparatus 15.

Next, a continued description of the configuration of the control apparatus 100 will be given with reference to FIG. 1.

The control apparatus 100 controls the overall operations of the automatic-driving vehicle 10. The control apparatus 100 is configured as a computer system that includes a central processing unit (CPU), a read-only memory (ROM), a random access memory (RAM), and the like. The control apparatus 100 according to the present embodiment is configured as a single apparatus. However, a mode in which the control apparatus 100 is configured by a plurality of apparatuses (computer systems) and the apparatuses operate while communicating with one another is also possible. In addition, a mode in which the control apparatus 100, in part or in its entirety, is configured as a part of another electronic control unit (ECU) that is mounted in the automatic-driving vehicle 100 is also possible.

As a functional control block, the control apparatus 100 includes a traveling control unit 110, a load state detecting unit 120, and a collision preventing unit 130.

The traveling control unit 110 controls each of the drive apparatus 11, the braking apparatus 12, and the steering apparatus 13, described above, to perform processes that are necessary for the automatic-driving vehicle 10 to automatically travel. The traveling control unit 110 makes the automatic-driving vehicle 10 automatically travel along a course that is set in advance by a navigation system (not shown). In addition, when the periphery recognition sensor 14 detects the presence of an obstacle on the course, the traveling control unit 110 performs processes, such as making the automatic-driving vehicle 10 travel on a path that avoids the obstacle or making the automatic-driving vehicle 10 perform an emergency stop, as required.

The load state detecting unit 120 detects the load state of the other vehicle 20 that is present in the periphery. The load state detecting unit 120 detects the load state of the other vehicle 20 based on the information transmitted from the periphery recognition sensor 14. Specific examples of the load state detected by the load state detecting unit 120 will be described hereafter.

The collision preventing unit 130 performs a collision prevention process. The "collision prevention process" is performed to prevent, in advance, a collision of the automatic-driving vehicle 10 with a load 22 that may fall onto the road from the other vehicle 20. The collision prevention process is performed in advance before the load 22 falls onto the road, rather than being performed after the load 22 has fallen onto the road. The collision prevention process is performed based on the load state detected by the load state detecting unit 120. As a result, the likelihood of the automatic-driving vehicle 10 colliding with the load 22 that may fall onto the road from the other vehicle 20 can be reduced.

The collision prevention process according to the present embodiment is performed when the load state of the other vehicle 20 traveling in the periphery of the automatic-driving vehicle 10 is in a dangerous state in which the likelihood of the load 22 falling is high. For example, a so-called overloaded state can be given as such a dangerous state.

When the load weight (the weight of the load 22) of the other vehicle 20 exceeds a maximum load weight that is prescribed in advance, that is, when a loading ratio exceeds 100%, the likelihood of the load 22 falling from the other vehicle 20 is assumed to be high. The load state detecting unit 120 can calculate the loading ratio of the other vehicle 20 by calculating the load weight based on the size of the load 22 of which an image is captured by the periphery recognition sensor 14 or by acquiring the load weight based on information acquired through communication from the other vehicle 20.

Figure 3:
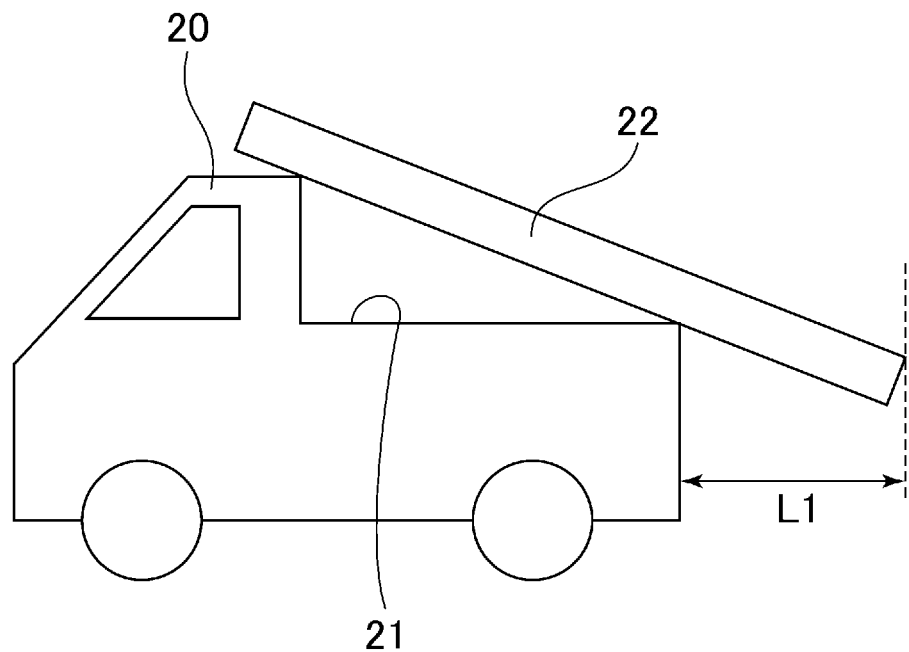
FIG. 3 is a diagram of an example of a state in which the likelihood of a load falling from another vehicle is high.

As another example of a dangerous state, as shown in an example in FIG. 3, a case in which a load 22 that has a relatively elongated shape is loaded in a state in which the load 22 is protruding further rearward than a rear end portion of the load-carrying bed 21 can be given. In such a state, the likelihood of the load 22 falling rearward from the load-carrying bed 21 becomes high.

In FIG. 3, an amount of rearward protrusion of the load 22 is denoted by L1. According to the present embodiment, when the load state detecting unit 120 detects that L1 is greater than a predetermined value, the collision preventing unit 130 performs the collision prevention process.

Figure 4:
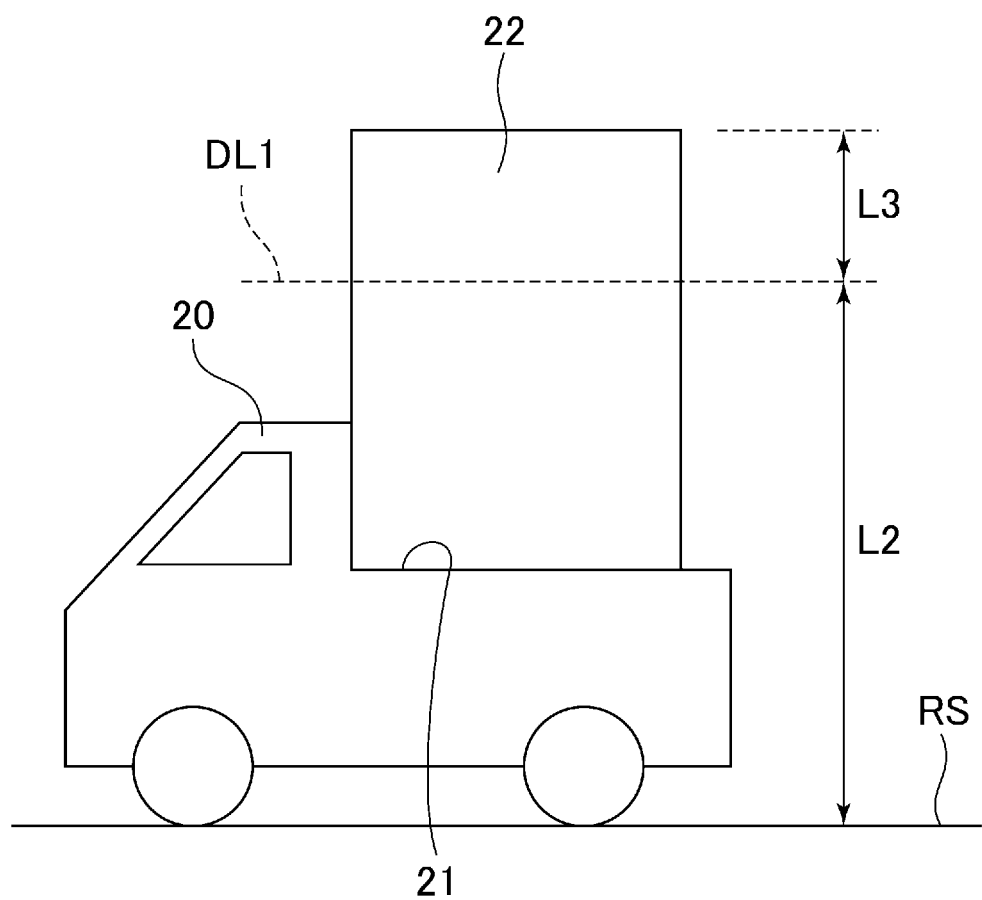
FIG. 4 is a diagram of an example of a state in which the likelihood of a load falling from another vehicle is high.

As another example of a dangerous state, as shown in an example in FIG. 4, a case in which a load 22 that has a relatively large shape is protruding further upward than a maximum load height of the other vehicle 20 can be given. The maximum load height refers to a height that is set in advance as a maximum value of a height from a road surface RS to an upper end of the loaded load 22. In such a state, the likelihood that, when the automatic-driving vehicle 10 enters a tunnel or the like, an upper portion of the load 22 collides with a tunnel wall or the like and the load 22 falls rearward from the load-carrying bed 21 becomes high.

In FIG. 4, the above-described maximum load height is denoted by L2. In addition, an amount of upward protrusion of the load 22 is denoted by L3. According to the present embodiment, when the load state detecting unit 120 detects that L3 is greater than a predetermined value, the collision preventing unit 130 performs the collision prevention process.

Figure 5:
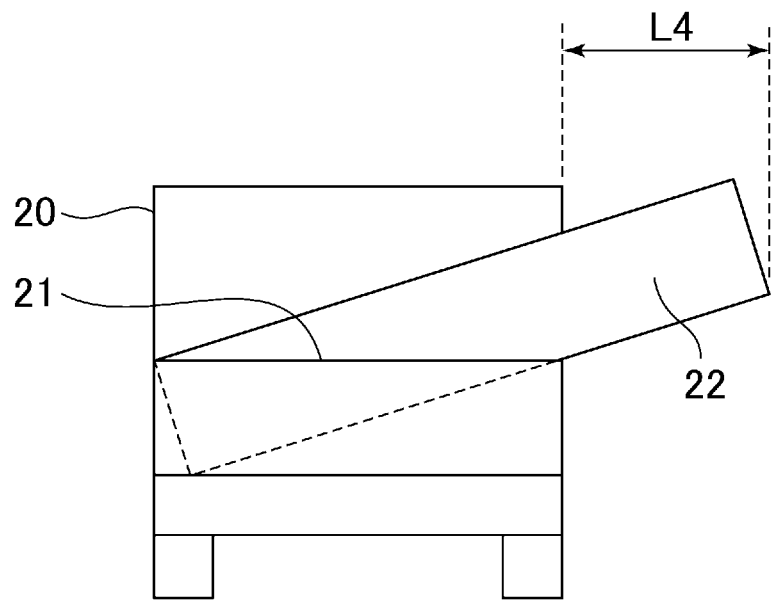
FIG. 5 is a diagram of an example of a state in which the likelihood of a load falling from another vehicle is high.

As another example of a dangerous state, as shown in an example in FIG. 5, a case in which a load 22 that has a relatively wide width is loaded in a state in which the load 22 protrudes further rightward than a right end portion of the load-carrying bed 21 can be given. In such a state, the likelihood of the load 22 falling rightward from the load-carrying bed 21 becomes high.

In FIG. 5, an amount of rightward protrusion of the load 22 is denoted by L4. According to the present embodiment, when the load state detecting unit 120 detects that L4 is greater than a predetermined value, the collision preventing unit 130 performs the collision prevention process. The foregoing similarly applies to cases in which the load 22 is protruding further leftward than a left end portion of the load-carrying bed 21.

Figure 6:
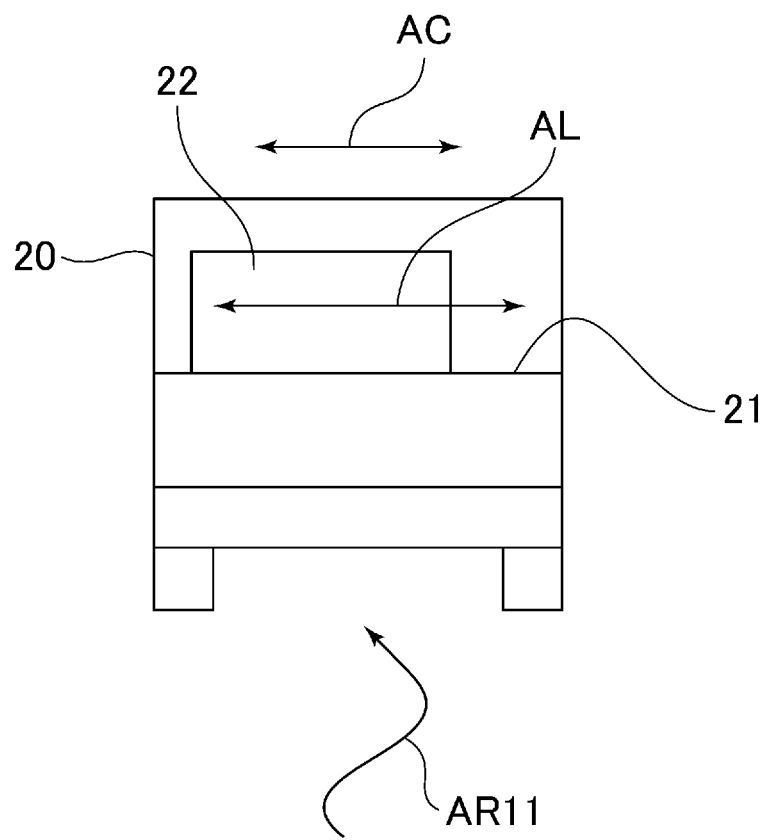
FIG. 6 is a diagram of an example of a state in which the likelihood of a load falling from another vehicle is high.

As another example of a dangerous state, as shown in an example in FIG. 6, a case in which a load 22 is not fixed to the load-carrying bed 21 can be given. In such a state, when the other vehicle 21 meanders as indicated by an arrow AR11 or the like, the load 22 slides to the left and right on the load-carrying bed 21. In such a state, the likelihood of the load 22 falling from the load-carrying bed 21 due to momentum of the sliding becomes high.

In FIG. 6, a breadth of the movement of the other vehicle 20 to the left and right is denoted by AC. A breadth of the movement of the load 22 to the left and right is denoted by AL. According to the present embodiment, when the above-described AL becomes greater than AC in the shaking of the other vehicle 20 and the load 22 that occurs during a predetermined period, the load state detecting unit 120 determines that the load 22 is not fixed to the load-carrying bed 21. The collision preventing unit 130 performs the collision prevention process.

Figure 7:
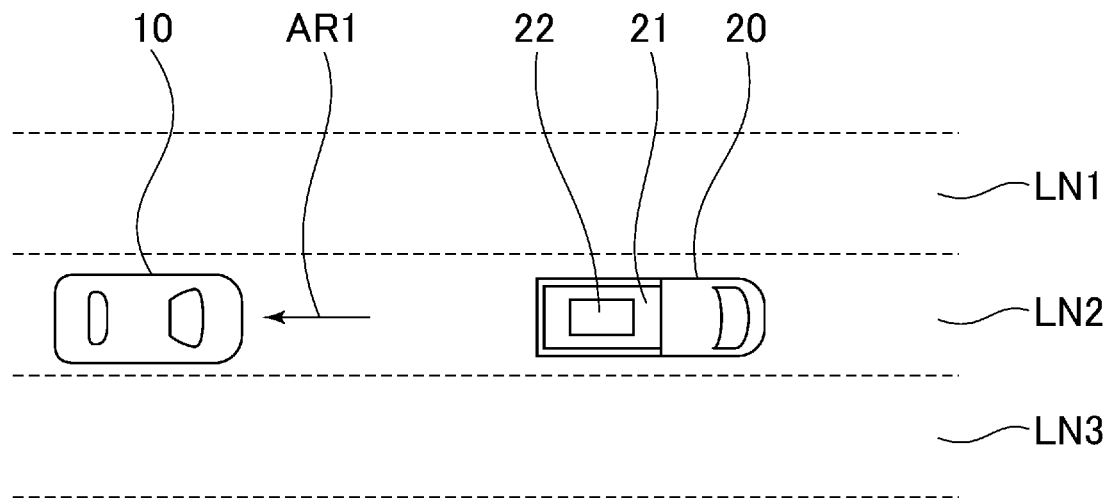
FIG. 7 is a diagram for explaining an overview of a collision prevention process.

Specific details of the collision prevention process will be described. FIG. 7 shows a top view of a road on which the automatic-driving vehicle 10 is traveling. The road has a traffic lane LN1 that is the leftmost traveling lane, a traffic lane LN2 that is the center traveling lane, and a traffic lane LN3 that is the rightmost traveling lane. This road configuration also applies to examples shown in FIG. 8 and FIG. 9, described hereafter.

FIG. 7 shows an example of a case in which the collision prevention process is performed when the automatic-driving vehicle 10 and the other vehicle 20 are traveling in the same traffic lane LN2, and the automatic-driving vehicle 10 is traveling behind the other vehicle 20. The collision preventing unit 130 in this example performs a process to temporarily decelerate the automatic-driving vehicle 10 as the collision prevention process.

As a result, a traveling position of the automatic-driving vehicle 10 relative to the position of the other vehicle 20 moves rearward as indicated by an arrow AR1. An inter-vehicle distance between the automatic-driving vehicle 10 and the other vehicle 20 increases. As a result, even if the load 22 subsequently falls onto the road from the other vehicle 20, the likelihood of the automatic-driving vehicle 10 colliding with the load 22 decreases.

Here, the collision prevention process in a mode such as that shown in FIG. 7 may only be performed when the load 22 is protruding rearward from the load-carrying bed 21 as in the example shown in FIG. 3.

Figure 8:
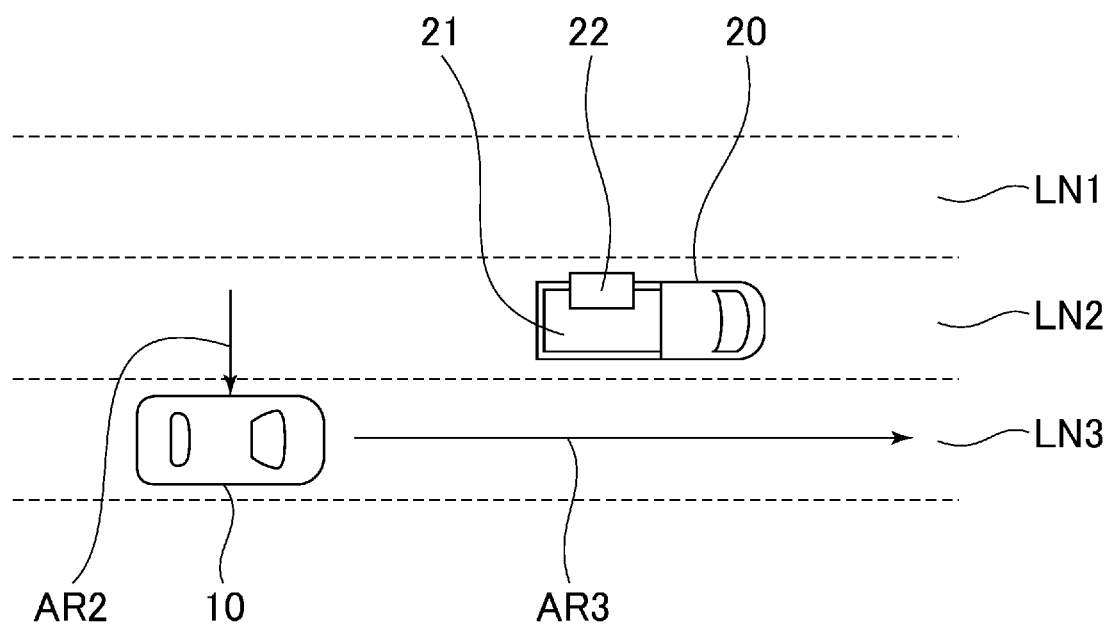
FIG. 8 is a diagram for explaining an overview of the collision prevention process.

In a manner similar to FIG. 7, FIG. 8 shows an example of a case in which the collision prevention process is performed when the automatic-driving vehicle 10 and the other vehicle 20 are traveling in the same traffic lane LN2, and the automatic-driving vehicle 10 is traveling behind the other vehicle 20. In the example in FIG. 8, the load 22 is loaded in a state in which the load 22 is protruding further leftward than the left end portion of the load-carrying bed 21 (that is, a state in which the load 22 is protruding in a direction opposite that in the example in FIG. 5).

The collision preventing unit 130 in this example performs a process to change the traffic lane in which the automatic-driving vehicle 10 is traveling from the traffic lane LN2 to the traffic lane LN3 that is to the right of the traffic lane LN2. As a result, the traveling position of the automatic-driving vehicle 10 relative to the position of the other vehicle 20 changes to the right side as indicated by an arrow AR2. The traffic lane LN3 to which the automatic-driving vehicle 10 moves is a traffic lane in a direction opposite the direction in which the load 22 is protruding from the load-carrying bed 21, when viewed from the other vehicle 22. As a result of the traveling position of the automatic-driving vehicle 10 being changed to such a position, even if the load 22 subsequently falls onto the road from the other vehicle 20, the likelihood of the automatic-driving vehicle 10 colliding with the load 22 decreases.

Here, in the example in FIG. 8, the collision prevention process that is performed when the load 22 is loaded in a state in which the load 22 is protruding further rightward than the right end portion of the load-carrying bed 21 (that is, the same state as that in the example in FIG. 5) is a process in which the traffic lane in which the automatic-driving vehicle 10 is traveling is changed to the traffic lane LN1 to the left of the traffic lane LN2.

When a traveling speed of the other vehicle 20 is lower than a speed limit or when a relative speed of the automatic-driving vehicle 10 relative to the other vehicle 20 is relatively high, control may be performed in which, after the lane change is performed so as to follow the arrow AR2, the automatic-driving vehicle 10 is moved to a position ahead of the other vehicle 20 as indicated by an arrow AR3. Because the load 22 will not fall in front of the other vehicle 20, the likelihood of the automatic-driving vehicle 10 colliding with the fallen load 22 can be further reduced.

Figure 9:
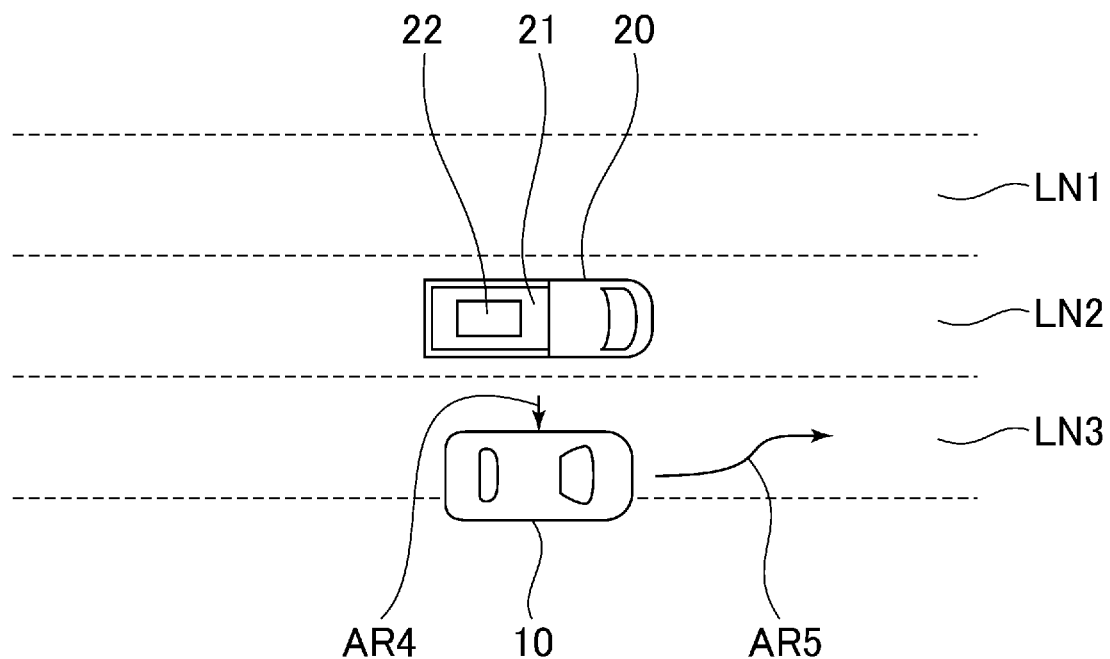
FIG. 9 is a diagram for explaining an overview of the collision prevention process.

FIG. 9 shows an example of a case in which the collision prevention process is performed when the other vehicle 20 that is traveling in the traffic lane LN2 and the automatic-driving vehicle 10 that is traveling in the traffic lane LN3 are traveling parallel to each other. As the collision prevention process, the collision preventing unit 130 in this example performs a process to change the traveling position of the automatic-driving vehicle 10 to a position farther away from the other vehicle 20. As a result, the traveling position of the automatic-driving vehicle 10 relative to the position of the other vehicle 20 moves rightward, as indicated by an arrow AR4. Therefore, even if the load 22 subsequently falls onto the road from the other vehicle 20, the likelihood of the automatic-driving vehicle 10 colliding with the load 22 decreases.

Here, the collision prevention process in a mode such as that shown in FIG. 9 may only be performed when the load 22 is protruding rightward from the load-carrying bed 21 (that is, towards the automatic-driving vehicle 10) as in the example shown in FIG. 5.

In this example as well, when the traveling speed of the other vehicle 20 is lower than the speed limit or when the relative speed of the automatic-driving vehicle 10 relative to the other vehicle 20 is relatively high, control may be performed in which, after the automatic-driving vehicle 10 is moved so as to follow the arrow AR4, the automatic-driving vehicle 10 is moved to a position ahead of the other vehicle 20 as indicated by an arrow AR5. As a result, the likelihood of the automatic-driving vehicle 10 colliding with the fallen load 22 can be further reduced.

The collision prevention process in a mode such as that shown in FIG. 9 can also be performed immediately before the other vehicle 20 and the automatic-driving vehicle 10 pass each other in cases in which the other vehicle 20 is traveling in an oncoming traffic lane (that is, when the other vehicle is traveling in an direction opposite that of the automatic-driving vehicle 10).

The mode of the collision prevention process may differ from those described above as long as the mode enables collision of the automatic-driving vehicle 10 with the load 22 to be prevented. For example, a process in which a traveling route set by a navigation system (not shown) is changed and a current route on which the other vehicle 20 is traveling is thereby avoided may be performed as the collision prevention process.

As described above, when the load state detecting unit 120 detects that the other vehicle 20 is in a dangerous state, such as an overloaded state, the collision preventing unit 130 performs a process to change the traveling position of the automatic-driving vehicle 10 relative to the position of the other vehicle 20 as the collision prevention process. The "other vehicle 20 is in a dangerous state" includes, in addition to being overloaded, a state in which a load is protruding from the other vehicle (FIG. 3, FIG. 4, and FIG. 5), a state in which a load is not fixed to the load-carrying bed of the other vehicle (FIG. 6), and the like.

When the automatic-driving vehicle 10 is traveling behind the other vehicle 20 as in the example in FIG. 7, the collision preventing unit 130 changes the traveling position of the automatic-driving vehicle 10 to a position farther behind the other vehicle 20. Meanwhile when the automatic-driving vehicle 10 is traveling to the side the other vehicle 20 as in the example in FIG. 9, the collision preventing unit 130 changes the traveling position of the automatic-driving vehicle 10 to a position that is further from the side of the other vehicle 20 (the side away from the other vehicle 20). In this manner, the collision preventing unit 130 changes the traveling position of the automatic-driving vehicle 10 in the collision prevention process based on the relative position of the automatic-driving vehicle 10 relative to the other vehicle 20. As a result, the collision prevention process can be performed in a mode that is appropriate for the surrounding state.

When the load 22 is not protruding outward from the side of the load-carrying bed 21 as in the example in FIG. 7, the collision preventing unit 130 changes the traveling position of the automatic-driving vehicle 10 to a position that is farther behind the other vehicle 20. Meanwhile, when the load 22 is protruding outward from the side of the load-carrying bed 21 as in the example in FIG. 8, the collision preventing unit 130 performs the process to change the traffic lane in which the automatic-driving vehicle 10 is traveling. In this manner, the collision preventing unit 130 changes the traveling position of the automatic-driving vehicle 10 based on the load state of the other vehicle 20. As a result, the collision prevention process can be performed in a mode that is appropriate for the surrounding state.

As described with reference to FIG. 8 and the like, when the traveling speed of the other vehicle 20 is lower than the speed limit or when the relative speed of the automatic-driving vehicle 10 relative to the other vehicle 20 is relatively high, the traveling position of the automatic-driving vehicle 10 is moved to a position ahead of the other vehicle 20. Meanwhile, when the traveling speed of the other vehicle 20 substantially matches the speed limit or the like, the process to move the traveling position of the automatic-driving vehicle 10 to a position ahead of the other vehicle 20 is not performed. In this manner, the collision preventing unit 130 changes the traveling position of the automatic-driving vehicle 10 based on the traveling speed of the other vehicle 20. As a result, the collision prevention process can be performed in a mode that is appropriate for the surrounding state.

A flow of processes performed by the control apparatus 100 to actualize the collision prevention process such as that described above will be described with reference to FIG. 10.

Figure 10:
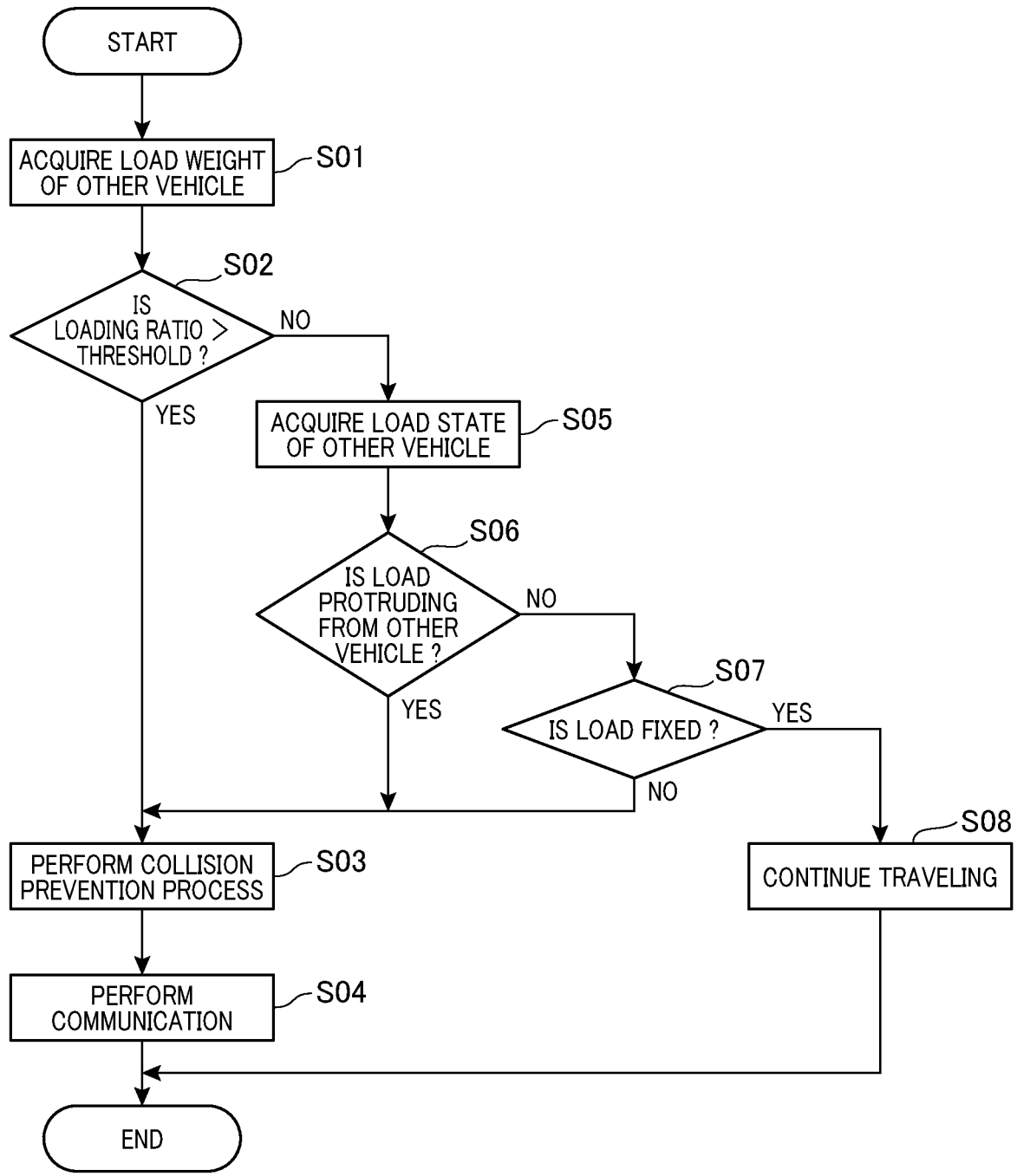
FIG. 10 is a flowchart of the flow of processes performed by the control apparatus in FIG. 1.

The control apparatus 100 repeatedly performs the series of processes shown in FIG. 10 each time a predetermined cycle elapses.

At an initial step S01 of the collision prevention process, the load state detecting unit 120 performs a process to acquire the load weight of the other vehicle 20. As described above, the load state detecting unit 120 can acquire the load weight of the other vehicle 20 based on the size of the load 22 captured by the camera of the periphery recognition sensor 14 or information acquired through communication with the other vehicle 20. In addition, the load state detecting unit 120 may acquire the load weight and the loading ratio of the other vehicle 20 through estimation based on the extent of swaying of the other vehicle 20 captured by the camera of the periphery recognition sensor 14.

At step S01, the control apparatus 100 calculates the loading ratio of the other vehicle 20 based on the load weight acquired as described above. At step S02 following step S01, the control apparatus 100 determines whether the loading ratio is greater than a predetermined threshold. The threshold is set in advance to a value of the loading ratio at which the likelihood of the load 22 falling from the other vehicle 20 is high. When determined that the loading ratio of the other vehicle 20 is greater than the threshold (i.e., a YES determination is made at step S02), the control apparatus 100 proceeds to step S03.

At step S03, the control apparatus 100 performs the collision prevention process in any one of the plurality of modes described with reference to FIG. 7 to FIG. 9. As described above, the mode of the collision prevention process performed herein is selected based on the relative positional relationship between the automatic-driving vehicle 10 and the other vehicle 20, the load state of the load 22 in the other vehicle 20, and the traveling speed of the other vehicle 20 at this time.

At step S04 following step S03, the control apparatus 100 performs a process to notify the other vehicle 20 through communication that the other vehicle 20 is in a dangerous state in which the load 22 may fall onto the road. As a result, a driver of the other vehicle 20 can be made to stop the other vehicle 20 or take measures required to prevent the load 22 from falling. Here, when the load state of the load 22 is in an illegal state, such as overloading, the control apparatus 100 may perform a process to notify the police, in addition to the above-described notification.

When determined that the loading ratio of the other vehicle 20 is equal to or less than the threshold at step S02 (i.e., a NO determination is made at step S02), the control apparatus 100 proceeds to step S05. At step S05, the load state detecting unit 120 performs a process to acquire the load state of the other vehicle 20. The "load state" herein refers to information other than the load weight acquired at step S01, among the information indicating the state of the load 22. The information includes at least the state of fixture of the load 22 onto the load-carrying bed 21 and the amount of protrusion of the load 22 from the load-carrying bed 21.

At step S06 following step S05, the control apparatus 100 determines whether the load 22 is protruding from the other vehicle 20. Here, when any of L1 in FIG. 3, L3 in FIG. 4, and L4 in FIG. 5 exceeds the predetermined values that are respectively set for L1, L3, and L4, the control apparatus 100 determines that the load 22 is protruding. When determined that the load 22 is protruding (i.e., a YES determination is made at step S06), the control apparatus 100 proceeds to step S03 and performs the collision prevention process. When determined that the load 22 is not protruding at step S06 (i.e., a NO determination is made at step S06), the control apparatus 100 proceeds to step S07.

At step S07, the load state detecting unit 120 determines whether the load 22 is fixed to the load-carrying bed 21 of the other vehicle 20. The determination method is as described with reference to FIG. 6. When determined that the load 22 is not fixed (i.e., a NO determination is made at step S07), the control apparatus 100 proceeds to step S03 and performs the collision prevention process. When determined that the load 22 is fixed (i.e., a YES determination is made at step S07), the control apparatus 100 proceeds to step S08.

When the control apparatus 100 proceeds to step S08, the likelihood of the load 22 falling from the load-carrying bed 21 is low. Therefore, in this case, the control apparatus 100 does not perform the collision prevention process. The automatic-driving vehicle 10 continues to travel in a manner similar to that up to this point.

Second Embodiment

Next, a second embodiment will be described. According to the present embodiment, only the mode of the processes performed by the control apparatus 100 differs from that according to the first embodiment. The second embodiment is identical to the first embodiment in other aspects.

According to the present embodiment, the process performed when the loading ratio is determined to exceed the threshold at step S02 in FIG. 10 differs from that according to the first embodiment. The details of the process will be described with reference to FIG. 11. The series of processes shown in FIG. 11 is performed instead of step S03 in FIG. 10.

Figure 11:
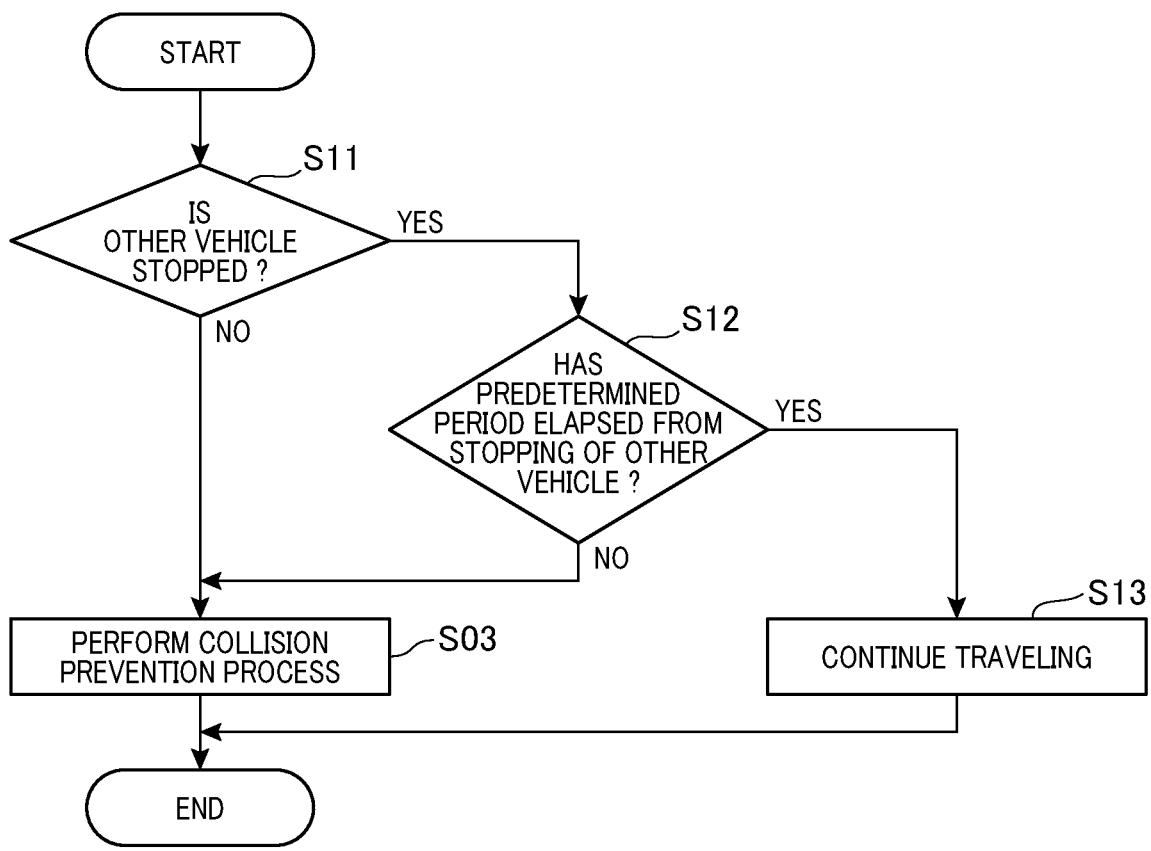
FIG. 11 is a flowchart of the flow of processes performed by a control apparatus according to a second embodiment.

When determined that the loading ratio exceeds the threshold at step S02 in FIG. 10, the control apparatus 100 proceeds to step S11 in FIG. 11. At step S11, the control apparatus 100 determines whether the other vehicle 20 is stopped. The control apparatus 100 makes the determination based on the traveling speed of the other vehicle 20 that is detected by the periphery detection sensor 14. When determined that the other vehicle 20 is not stopped and is traveling (i.e., a NO determination is made at step S11 the control apparatus 100 proceeds to step S03. Step S03 in FIG. 11 is identical to step S03 in FIG. 10. Therefore, in this case, the control apparatus 100 performs the collision prevention process.

When determined that the other vehicle 20 is stopped at step S11 (i.e., a YES determination is made at step S11 the control apparatus 100 proceeds to step S12. At step S12, the control apparatus 100 determines whether a predetermined period has elapsed from when the other vehicle 20 is stopped to a current point in time. The predetermined period is set in advance to a length of time that is required for the state of the load 22 on the load-carrying bed 21 to be stabilized from when the other vehicle 20 is stopped. When determined that the predetermined period has not elapsed from when the other vehicle 20 is stopped (i.e., a NO determination is made at step S12), the control apparatus 20 proceeds to step S03 and performs the collision prevention process. When determined that the predetermined period has elapsed (i.e., a YES determination is made at step S12), the control apparatus 100 proceeds to step S13.

Measurement of the elapsed time from when the other vehicle 20 is stopped is started upon the stopping of the other vehicle 20 being detected through the camera of the periphery recognition sensor 14. Alternatively, measurement of the elapsed time may be performed upon the stopping of the other vehicle 20 being confirmed through communication with the other vehicle 2, a management center, or the like. In addition, the elapsed time from when the other vehicle 20 is stopped may be acquired through direct communication with the other vehicle 20 or the like. Here, when the elapsed time from when the other vehicle 20 is stopped cannot be measured or acquired, the control apparatus 100 may proceed from step S12 to step S03.

When the control apparatus 100 proceeds to step S13, the other vehicle 20 is stopped and the state of the load 22 on the load-carrying bed 21 is stabilized. Therefore, the likelihood of the load 22 falling from the other vehicle 20 is low. Thus, in this case, the control apparatus 100 does not perform the collision prevention process.

As described above, the collision preventing unit 130 according to the present embodiment is configured to perform the collision prevention process when the other vehicle 20 is traveling. In principle, the collision preventing unit 130 does not perform the collision prevention process when the other vehicle 20 is stopped. Therefore, for example, when the automatic-driving vehicle 10 is stopping in a parking area or the like, a stopping position of the automatic-driving vehicle 10 is not needlessly restricted as a result of the other vehicle 20 that is parked nearby.

Third Embodiment

Next, a third embodiment will be described. According to the present embodiment as well, only the mode of the processes performed by the control apparatus 100 differs from that according to the first embodiment. The third embodiment is identical to the first embodiment in other aspects.

The control apparatus 100 according to the present embodiment is capable of making the automatic-driving vehicle 10 travel in a platoon with a plurality of vehicles in the periphery. In platooning, through communication among a plurality of vehicles including the automatic-driving vehicle 10, all of the vehicles can travel at a same speed, decelerate and accelerate at a same timing, and the like.

Figure 12:
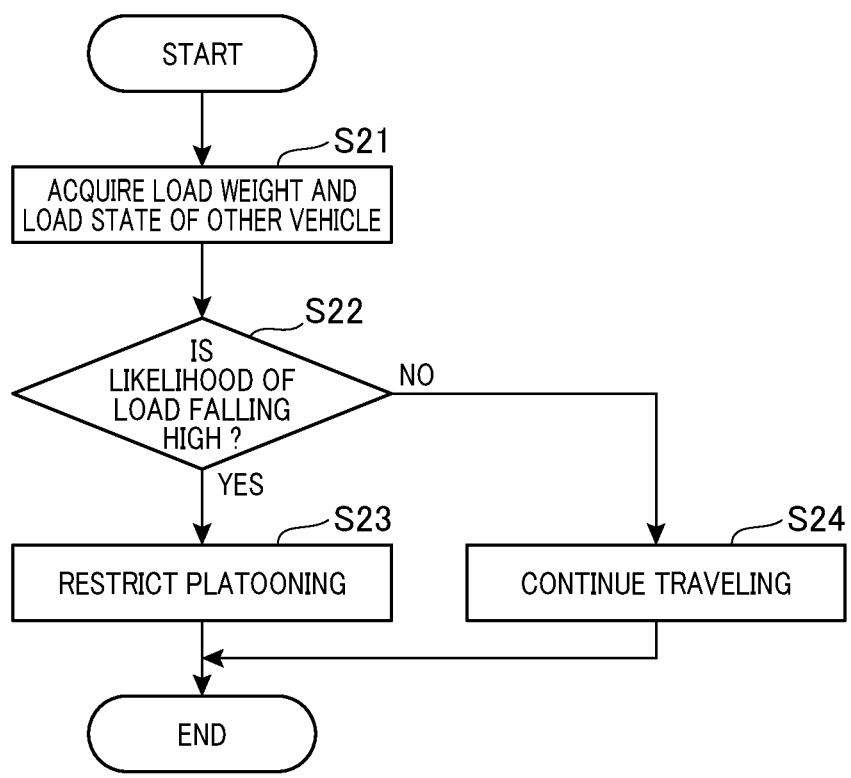
FIG. 12 is a flowchart of the flow of processes performed by a control apparatus according to a third embodiment.

A series of processes shown in FIG. 12 is processes that are repeatedly performed by the control apparatus 100 each time a predetermined cycle elapses when the automatic-driving vehicle 10 is traveling in a platoon as described above. This series of processes is performed in parallel with the series of processes shown in FIG. 10.

At an initial step S21, the load state detecting unit 120 performs a process to acquire the load weight and the load state of the other vehicle 20. Here, the "other vehicle 20" refers to a single arbitrary vehicle among the plurality of vehicles included in the platoon. Here, the same information as that acquired at step S01 and step S05 in FIG. 10 is acquired regarding the other vehicle 20.

At step S22 following step S21, the control apparatus 100 determines whether the likelihood of the load 22 falling onto the road from the load-carrying bed 21 is high based on the information acquired at step S21. The determination method is identical to that described regarding step S02, step S06, and step S07 in FIG. 10. The likelihood of the load 22 falling onto the road from the load-carrying bed 21 being high refers to cases such as that in which the control apparatus 100 proceeds to step S03 in the processes in FIG. 10.

When determined that the likelihood of the load 22 falling is high (i.e., a YES determination is made at step S22), the control apparatus 100 proceeds to step S23. At step S23, the control apparatus 100 performs a process to restrict platooning that includes the other vehicle 20. For example, the "process to restrict platooning" is a process in which the other vehicle 20 is requested to leave the platoon. Alternatively, a process to move the other vehicle 20 to a rearmost position in the platoon may be performed. Moreover, a process to reduce the speed of the overall platoon, a process to stop the overall platoon, or a process to prohibit the vehicles in the platoon from starting up from the stopped state (a process to prohibit output of driving force) may be performed.

Figure 13:
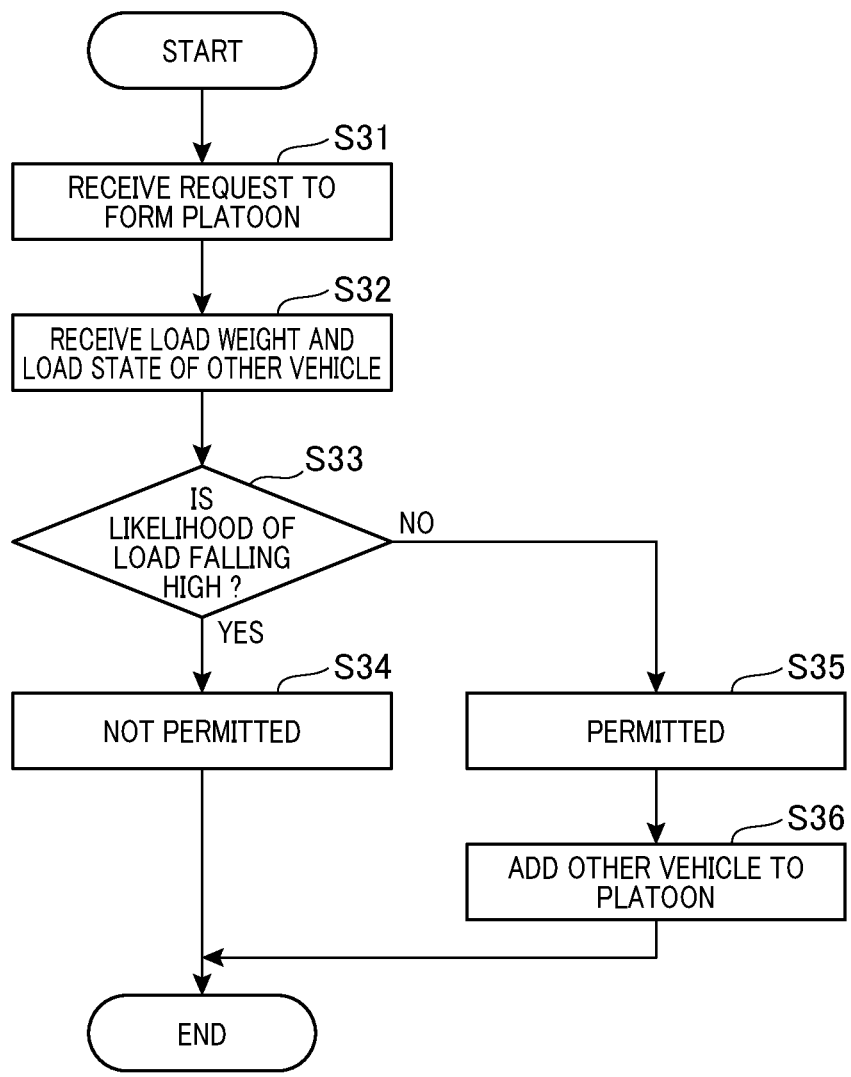
FIG. 13 is a flowchart of the flow of processes performed by a control apparatus according to the third embodiment.

In the automatic-driving vehicle 10 according to the present embodiment, a request to join the platoon may be received from another vehicle 20 that is not a part of the platoon. In addition, when the automatic-driving vehicle 10 is not traveling in a platoon, a request to form a new platoon may be received from another vehicle 20. In such cases, the control apparatus 100 performs processes shown in FIG. 13.

At an initial step S31 of the processes, the control apparatus 100 performs a process to receive the request from the other vehicle 20. At step S32 following step S31, the load state detecting unit 120 performs a process to acquire the load weight and the load state of the other vehicle 20. Here, the same information as that acquired at step S01 and step S05 in FIG. 10 is acquired regarding the other vehicle 20.

At step S33 following step S32, the control apparatus 100 determines whether the likelihood of the load 22 falling onto the road from the load-carrying bed 21 is high based on the information acquired at step S32. The determination method is identical to that described regarding step S02, step S06, and step S07 in FIG. 10. The likelihood of the load 22 falling onto the road from the load-carrying bed 21 being high refers to cases such as that in which the control apparatus 100 proceeds to step S03 in the processes in FIG. 10.

When determined that the likelihood of the load 22 falling onto the road from the load-carrying bed 21 is high, the control apparatus 100 proceeds to step S34. At step S34, the control apparatus 100 performs a process to notify the other vehicle 20, through communication, that the other vehicle 20 is not permitted to join the platoon (or formation of a new platoon with the other vehicle 20 is not permitted).

When determined that the likelihood of the load 22 falling onto the road from the load-carrying bed 21 is low at step S33, the control apparatus 100 proceeds to step S35. At step S35, the control apparatus 100 performs a process to notify the other vehicle 20, through communication, that the other vehicle 20 is permitted to join the platoon (or formation of a new platoon with the other vehicle 20 is permitted).

At step S36 following step S35, the control apparatus 100 performs a process that is required to add the other vehicle 20 to the platoon (or to form a new platoon with the other vehicle 20). Specifically, the control apparatus 100 performs a process to share, with the other vehicle 20, the driving force, the braking force, the steering angle, and the timings of changes in the driving force, the braking force, and the steering angle of each vehicle included in the platoon.

As described above, when the likelihood of the load 22 falling from the other vehicle 20 is high, the collision preventing unit 130 according to the present embodiment performs a process to restrict the automatic-driving vehicle 10 from traveling in a platoon with the other vehicle 20. As a result, the vehicles in the platoon including the automatic-driving vehicle 10 are prevented from colliding with the load 22 that has fallen from the other vehicle 20. The process to restrict platooning is performed as a mode of the collision prevention process according to the present embodiment.

Fourth Embodiment

Next, a fourth embodiment will be described. According to the present embodiment as well, only the mode of the processes performed by the control apparatus 100 differs from that according to the first embodiment. The fourth embodiment is identical to the first embodiment in other aspects.

The collision preventing unit 130 of the control apparatus 100 according to the present embodiment is configured to also perform a collision avoidance process, in addition to the collision prevention process similar to that according to the first embodiment. The "collision avoidance process" is a process for avoiding collision of the automatic-driving vehicle 10 with the load 22 when the load 22 has (actually) fallen onto the road from the other vehicle 20.

A flow of processes performed by the control apparatus 100 according to the present embodiment will be described with reference to FIG. 14. The series of processes shown in FIG. 14 is processes that are repeatedly performed by the control apparatus 100 each time a predetermined cycle elapses. This series of processes is performed in parallel with the series of processes shown in FIG. 10.

At an initial step S41, the control apparatus 100 determines whether a load 22 that has fallen onto the road from the load-carrying bed 21 of the other vehicle 20 is detected. The fallen load 22 can be detected by the periphery recognition sensor 14.

When determined that a fallen load 22 is not detected, the control apparatus 100 ends the series of processes shown in FIG. 14. When determined that a fallen load 22 is detected, the control apparatus 100 proceeds to step S42. At step S42, the control apparatus 100 performs a process to notify the other vehicle 20, through communication, that the load 22 has fallen onto the road. As a result, the driver of the other vehicle 20 can be made to take measures such as stopping the other vehicle 20, removing the fallen load 22, and the like.

In addition, at step S42, the control apparatus 100 may notify a management center that manages the road or the like that the load 22 has fallen. When the position in which the load 22 has fallen is in a power transfer lane in which so-called dynamic power transfer can be performed, the control apparatus 100 may notify the management center or the like with a request to stop power transfer.

At step S43 following step S42, the control apparatus 100 performs a process to acquire the shape of the fallen load 22. The control apparatus 100 can perform the process by analyzing an image captured by the camera of the periphery recognition sensor 14 or the like. Here, the control apparatus 100 acquires the size and, more specifically, the height of the load 22.

At step S44 following step S43, the control apparatus 100 determines whether the size (height) of the fallen load 22 is less than a predetermined threshold. The threshold is set in advance as the size of the load 22 at which the load 22 can pass beneath the body of the automatic-driving vehicle 10. When determined that the size of the load 22 is equal to or greater than the threshold, the control apparatus 100 proceeds to step S45.

At step S45, the control apparatus 100 performs a process to make the steering apparatus 13 perform steering and make the automatic-driving vehicle 10 travel on a path that enables the automatic-driving vehicle 10 to avoid traveling directly over the load 22. This process is included in the "collision avoidance process," described above. As a result, collision of the automatic-driving vehicle 10 with a relatively large load 22 is avoided.

When determined that the size of the fallen load 22 is less than the threshold at step S44, the control apparatus 100 proceeds to step S46. At step S46, the control apparatus 100 performs a process to make the automatic-driving vehicle 10 travel on a path that enables the automatic-driving vehicle 10 to pass over the load 22.

Specifically, the control apparatus 100 performs a process to make the automatic-driving vehicle 10 travel on a path that enables the load 22 to pass between the front wheels and between the rear wheels of the automatic-driving vehicle 10. Because the size of the load 22 is less than the threshold, the load 22 does not come into contact with the body of the automatic-driving vehicle 10. This process, together with the process at step S45, is included in the "collision avoidance process," described above. In this case, because change in the advancing direction of the automatic driving vehicle 10 is small, the likelihood of the automatic-driving vehicle 10 coming into contact with vehicles traveling in the periphery can also be reduced.

Here, the above-described process performed at step S46 (passing over the load 22) is a process that is performed when the load 22 is present in the center of the course. When the load 22 is present in a position that is further leftward or rightward on the course, the control apparatus 100 performs a process to make the automatic driving vehicle 10 travel on a path that enables the automatic-driving vehicle 10 to avoid traveling directly over the load 22 in a manner similar to that at step S45. In this manner, whether to make the automatic-driving vehicle 10 pass over the load 22 or avoid the load 22 is selected based on the position in which the load 22 has fallen.

As described above, the processes (step S45 and step S46) in two modes are provided in advance as the collision avoidance process according to the present embodiment. The collision preventing unit 130 changes the mode of the collision avoidance process based on the shape of the fallen load 22. As a result, the control apparatus 100 can perform the collision avoidance process in a mode that is appropriate for the shape of the load 22. The automatic-driving vehicle 10 can thereby avoid the load 22.

Modes other than those described above may be provided as the collision avoidance process. For example, when the shape of the fallen load 22 is even smaller than that when the control apparatus 100 proceeds to step S46, the automatic driving vehicle 10 may be made to travel as is without the steering of the automatic driving vehicle 10 being performed. In this case, the wheels may pass over the load 22 on the road. However, because the load 22 is small, traveling of the automatic driving vehicle 10 is not inhibited.

The embodiments are described above with reference to specific examples. However, the present disclosure is not limited to these specific examples. Design modifications in these specific examples made as appropriate by a person skilled in the art are also included in the scope of the present disclosure, as long as the characteristics of the present disclosure are included. Elements, and arrangements, conditions, shapes, and the like of these elements provided in the above-described specific examples are not limited thereto, and may be modified as appropriate. Combinations of the elements included in the above-described specific examples may be changed as appropriate, as long as technical contradictions do not occur.

What is claimed is:

1. A control apparatus for an automatic-driving vehicle, the control apparatus comprising:
   a computer processor configured to function as:
     a load state detecting unit that detects a load state of an other vehicle that is present in front of the automatic-driving vehicle; and a collision preventing unit that performs a collision prevention process based on the load state of the other vehicle detected by the load state detecting unit, the collision prevention process being a process for preventing, in advance, collision of the automatic-driving vehicle with a load that may fall onto a road from the other vehicle, wherein the collision preventing unit performs the collision prevention process in response to the other vehicle being in a traveling state in front of the automatic-driving vehicle, the collision preventing unit performs a process to change a traveling position of the automatic-driving vehicle relative to a position of the other vehicle as the collision prevention process, in response to the load state detecting unit detecting that the other vehicle, located in front of the automatic-driving vehicle, is in an overloaded state, and the collision preventing unit performs the process to change the traveling position of the automatic-driving vehicle relative to the position of the other vehicle as the collision prevention process in response to the load state detecting unit detecting that the load is protruding rearwardly from a rearward-most end of the other vehicle.

2. The control apparatus according to claim 1, wherein:
when the load state detecting unit detects a state in which the load is not fixed to a load-carrying bed of the other vehicle, the collision preventing unit performs the process to change the traveling position of the automatic-driving vehicle relative to the position of the other vehicle as the collision prevention process.

3. The control apparatus according to claim 2, wherein:
the collision preventing unit changes the traveling position of the automatic-driving vehicle in the collision prevention process based on a relative position of the automatic-driving vehicle relative to the other vehicle.

4. The control apparatus according to claim 2, wherein:
the collision preventing unit changes the traveling position of the automatic-driving vehicle based on the load state.

5. The control apparatus according to claim 2, wherein:
the collision preventing unit changes the traveling position of the automatic-driving vehicle based on a traveling speed of the other vehicle.

6. The control apparatus according to claim 1, wherein:
the collision preventing unit changes the traveling position of the automatic-driving vehicle in the collision prevention process based on a relative position of the automatic-driving vehicle relative to the other vehicle.

7. The control apparatus according to claim 1, wherein:
the collision preventing unit changes the traveling position of the automatic-driving vehicle based on the load state.

8. The control apparatus according to claim 1, wherein:
the collision preventing unit changes the traveling position of the automatic-driving vehicle based on a traveling speed of the other vehicle.

9. The control apparatus according to claim 1, wherein:
the collision preventing unit performs a process to restrict the automatic-driving vehicle from traveling in a platoon with the other vehicle as the collision prevention process.

10. The control apparatus according to claim 1, wherein:
the collision preventing unit is configured to also perform a collision avoidance process when the load falls onto the road from the other vehicle, the collision avoidance process being a process for avoiding collision of the automatic-driving vehicle with the load.

11. The control apparatus according to claim 10, wherein:
the collision preventing unit changes a mode of the collision avoidance process based on a shape of the load that has fallen.

12. The control apparatus according to claim 1, wherein:
the collision preventing unit performs the process to change the traveling position of the automatic-driving vehicle relative to the position of the other vehicle as the collision prevention process when the load state detecting unit detects that the load is protruding rearwardly from the rearward-most end of the other vehicle by an amount that is greater than a predetermined value.

13. A control system for an automatic-driving vehicle, the system comprising:
a processor:
a non-transitory computer-readable storage medium; and
a set of computer-readable instructions stored in the computer-readable storage medium that cause the processor to implement:
detecting a load state of another vehicle that is present in front of the automatic-driving vehicle; and
performing a collision prevention process based on the load state of the another vehicle, the collision prevention process being a process for preventing, in advance, collision of the automatic-driving vehicle with a load that may fall onto a road from the other vehicle, wherein the collision prevention process is performed in response to the another vehicle being in a traveling state in front of the automatic-driving vehicle, the collision prevention process performs a process to change a traveling position of the automatic-driving vehicle relative to a position of the other vehicle as the collision prevention process, in response to the detected load state indicating that the other vehicle, located in front of the automatic-driving vehicle, is in an overloaded state, and the collision prevention process performs the process to change the traveling position of the automatic-driving vehicle relative to the position of the other vehicle as the collision prevention process in response to the detected load state indicating that the load is protruding rearwardly from a rearward-most end of the other vehicle.

14. The control system according to claim 13, wherein:
the collision prevention process performs the process to change the traveling position of the automatic-driving vehicle relative to the position of the other vehicle as the collision prevention process when the detected load state indicates that the load is protruding rearwardly from the rearward-most end of the other vehicle by an amount that is greater than a predetermined value.

15. A control method for controlling an automatic-driving vehicle, the control method comprising:
detecting, by a computer processor provided in the automatic-driving vehicle, a load state of another vehicle that is present in front of the automatic-driving vehicle; and
performing, by the computer processor, a collision prevention process based on the load state of the another vehicle, the collision prevention process being a process for preventing, in advance, collision of the automatic-driving vehicle with a load object that may fall onto a road from the other vehicle, wherein the computer processor performs the collision prevention process in response to the another vehicle being in a traveling state in front of the automatic-driving vehicle, the collision prevention process performs a process to change a traveling position of the automatic-driving vehicle relative to a position of the other vehicle as the collision prevention process, in response to the detected load state indicating that the other vehicle, located in front of the automatic-driving vehicle, is in an overloaded state, and the collision prevention process performs the process to change the traveling position of the automatic-driving vehicle relative to the position of the other vehicle as the collision prevention process in response to the detected load state indicating that the load is protruding rearwardly from a rearward-most end of the other vehicle.

16. The control method according to claim 15, wherein:

the collision prevention process performs the process to change the traveling position of the automatic-driving vehicle relative to the position of the other vehicle as the collision prevention process when the detected load state indicates that the load is protruding rearwardly from the rearward-most end of the other vehicle by an amount that is greater than a predetermined value.

* * * * *